United States Patent [19]
Erickson

[11] 3,867,314
[45] Feb. 18, 1975

[54] PROCESS FOR THE PREPARATION OF A SUPPORTED IRIDIUM CATALYST

[75] Inventor: Henry Erickson, Park Forest, Ill.

[73] Assignee: Atlantic Richfield Company, New York, N.Y.

[22] Filed: Apr. 19, 1973

[21] Appl. No.: 352,809

[52] U.S. Cl. ............................ 252/466 PT, 208/138
[51] Int. Cl. ............................................. B01j 11/08
[58] Field of Search ............................. 252/466 PT

[56] References Cited
UNITED STATES PATENTS

| | | | |
|---|---|---|---|
| 2,635,080 | 4/1953 | Appell | 252/466 PT |
| 3,554,902 | 1/1971 | Buss | 252/466 PT |
| 3,730,909 | 5/1973 | Armstrong et al. | 252/466 PT |
| 3,761,428 | 9/1973 | Sugier et al. | 252/466 PT |

*Primary Examiner*—Arthur P. Demers
*Attorney, Agent, or Firm*—Thomas J. Clough

[57] ABSTRACT

A process for the preparation of a supported iridium catalyst by the contacting of, for example, an alumina support with a liquid medium containing a compound of iridium while maintaining the iridium-containing liquid medium at a pH of from 3 to 6 with an ammonium hydroxide or lower alkyl amine base. The catalyst is particularly useful in a reforming process.

10 Claims, No Drawings

PROCESS FOR THE PREPARATION OF A SUPPORTED IRIDIUM CATALYST

This invention relates to a process for the preparation of a supported iridium catalyst and, more particularly, to a process which provides for improved distribution of iridium on an inorganic oxide support.

Catalysts comprising platinum, for example, platinum-on-alumina, are well known and widely used for reforming of naphthas in order to produce high octane gasolines. Iridium has been proposed for use in catalytic reforming as a promoter for platinum-containing catalysts. Thus, U.S. Pat. No. 2,848,377 discloses reforming with a catalyst consisting of platinum and iridium on an alumina support. In U.S. Pat. No. 3,554,902, a particular reforming process is also disclosed using a platinum and iridium supported catalyst similar to the catalyst of U.S. Pat. No. 2,848,377.

A particular problem associated with preparing supported iridium catalyst is to obtain a substantial homogeneous dispersion or iridium on the support carrier. Thus, in Netherlands patent application No. 71/02303, a process for the preparation of a platinum-iridium supported catalyst is disclosed which improves upon the catalyst methods of manufacture disclosed in U.S. Pat. No. 2,848,337. As set forth in the Netherlands application, one of the problems associated with the preparation of a platinum-iridium supported catalyst is the referred to selective absorption phenomena which occurs during the impregnation of the carrier by the solution containing the active catalyst elements, for example, platinum and iridium. For example, the generally used ammonium salts such as the chlorophatinate or the other salts of ammonium or the chloroiridate, lead to the formation of agglomerates of the metals there by producing catalysts having significant activity loss.

It is an object of this invention to provide an improved process for the preparation of a supported iridium reforming catalyst. Other objects will be apparent from the following description.

It has now been found that an improved supported iridium catalyst can be obtained by process which comprises impregnating an alumina-containing support with a liquid medium containing a decomposable solubilized iridium compound, maintaining the pH of the liquid medium during impregnation of the support in the range of from 3 to 6, preferably from about 3.5 to about 5, with a base selected from ammonium hydroxide, a lower alkyl amine, and mixtures thereof to yield an iridium-alumina composite comprising from about 0.01 to about 1 weight % of iridium and subjecting the resulting iridium-alumina composite to drying, calcination and reduction.

In the process of this invention, the alumina-containing support is impregnated with the iridium-containing liquid medium preferably containing a platinum or palladium metal component, preferably platinum. The metals are present in the liquid medium, i.e., as in an aqueous solution, at a sufficient concentration to provide the desired quantity of iridium and platinum metal in the finished catalyst. In general, the temperature of impregnation is from about ambient to about 212°F., more preferably from about 140°F. to about 200°F. The temperature of the liquid medium is maintained at a level sufficient to solubilize substantially all of the iridium compound, preferably all of the iridium compound. The impregnation of the alumina-containing support can be at a pressure of from about 0.01 to about 100 atmospheres, more preferably from about 0.01 to about 0.1 atmospheres. The use of a pressure below atmospheric pressure is particularly advantageous in the process of this invention. It is essential that the liquid medium is adjusted to a pH of from about 3 to 6 prior to contact with the alumina-containing support. The base material, e.g., ammonium hydroxide and/or lower alkyl amine, is added to the liquid medium at a concentration sufficient to provide the requisite pH for the liquid medium. As set forth above, it is preferred to use co-impregnation of the alumina-containing support with the iridium and platinum compounds. However, it is contemplated within the scope of this invention that the alumina-containing support can be a catalyst comprising platinum-on-alumina. In such cases, the platinum in general exists in the reduced form. It is, therefore, preferred that the platinum-on-alumina containing support be subjected to oxidizing conditions followed by the impregnation with the iridium compound utilizing the process of this invention. Alternatively, sequential impregnation can be utilized to prepare the iridium composite with either type metal compound being utilized as the first metal. If the metals are sequentially added to the alumina support as, for example, by sequential impregnation, the carrier containing the first metal compound added can be dried and calcined prior to addition of the second metal compound. Thereafter, the carrier containing both metals can be dried and calcined. In any event, the iridium-alumina containing composite is prepared according to the process of this invention.

The final unreduced catalyst, prepared by a method set forth above, is generally dried at a temperature of from about 200°F. to about 600°F. for a period of from about 2 to 24 hours or more and finally calcined at a temperature of about 700°F. to about 1500°F., preferably from about 850°F. to about 1300°F. for a period of from about 1 hour to about 20 hours and preferably from about 1 hour to about 5 hours.

The resultant calcined catalyst is generally subjected to reduction prior to use in the conversion of hydrocarbons. This step as previously noted is designed to insure chemical reduction of at least a portion of the metallic components.

The reducing media in general contacts the calcined catalyst at a temperature of about 800°F. to about 1200°F., at a pressure in the range from about 0 psig. to about 500 psig. and for a period of time of about 0.5 to 10 hours or more and in any event, for a time which is effective to chemically reduce at least a portion, preferably a major portion, of each of the metallic components, i.e., platinum or palladium metal and iridium component, of the catalyst. By chemical reduction is meant the lowering of oxidation states of the metallic components below the oxidation state of the metallic component in the unreduced catalyst. For example, the unreduced catalyst may contain iridium salts in which the iridium has an oxidation state which can be lowered or even reduced to elemental iridium by contacting the unreduced catalyst with hydrogen. This reduction treatment is preferably performed in situ (i.e., in the reaction zone in which it is to be used), as part of a start-up operation using fresh unreduced catalyst.

The essential constituent of the catalyst is iridium. This component may be present as an elemental metal, as a chemical compound, such as the oxide, sulfide or halide, or in a physical or chemical association with the inorganic oxide support and/or the other components of the catalyst. Generally, the iridium component is utilized in an amount which results in a catalyst composite containing from about 0.01% to about 1%, preferably from about 0.025% to about 0.50%, by weight of iridium calculated as the elemental metal. The iridium component may be incorporated in the catalyst at any stage in the preparation of the catalyst. As stated above, the procedure for incorporating the iridium component involves the impregnation of the support or its precursor, either in the form of a sol or gel, before, during or after the time platinum or palladium or mixtures thereof are added. The impregnation solution is, in general, an aqueous solution suitable solubilized iridium salt such as chloroiridic acid, iridium tetrachloride, the ammonium complexes such as ammonium chloroiridate, iridium tribromide, iridium trichloride and ammonium chloroiridite. It is preferred to use chloroiridic acid as the source of iridium for the preparation of the supported catalysts. In general, the iridium component can be impregnated either prior to, simultaneously with, or after the platinum or palladium metal component is added to the support. However, it has been found that best results are achieved when the iridium component is impregnated simultaneously with the platinum or palladium component. A preferred impregnation solution contains chlorophlatinic acid and chloroiridic acid.

The combined weight of the iridium component plus the platinum and/or palladium component in the catalytic composite may be within the range of from about 0.1% to about 4% by weight, preferably from about 0.2% to about 2.0% by weight and, more preferably, from about 0.3% to about 1.0% by weight, calculated on an elemental basis.

Typical examples of alkyl amine bases which can be utilized in the process of this invention are represented by the following structural formula:

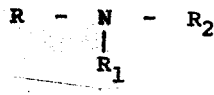

wherein R, $R_1$ and $R_2$ are selected from the group consisting of hydrogen, alkyl containing from 1 to 6 carbon atoms, preferably 1 to 2 carbon atoms and cycloalkyl, provided, however, that not more than two R groups are hydrogen and R and $R_1$ can, together with the nitrogen atom, form a heterocyclic ring containing from 5 to 6 aliphatic carbon atoms. Typical examples of such amines are methyl amine, ethyl amine, t-butyl amine, diethyl amine, triethyl amine, tri-n-butyl amine, cyclohexyl amine, and piperidine.

As set forth above, it is preferred that the iridium-alumina containing support contain at least one platinum group metal selected from platinum and palladium. The platinum and palladium component may exist within the final unreduced catalyst at least in part as a compound such as an oxide, sulfide, halide and the like, or in the elemental state. Generally, the amount of the platinum or palladium component present in the final catalyst is small compared to the quantities of the other components combined therewith. The platinum or palladium generally has from about 0.5% to about 3.0%, preferably from about 0.10% to about 1.0%, by weight of the catalyst calculated on an elemental basis.

Excellent results are obtained when the catalyst contains from 0.2% to about 0.9% by weight of the platinum group metal.

The platinum or palladium may be incorporated in the catalyst by the contacting of the alumina support and/or alumina hydrogel and/or alumina sol or gel at any stage in its preparation, either after or before calcination of the alumina hydrogel. The preferred method for adding the platinum or palladium to the alumina support involves the utilization of a water-soluble compound of the platinum or palladium to impregnate the alumina support prior to calcination. For example, platinum may be added to the support by comingling the uncalcined inorganic oxide support with an aqueous solution of chlorophlatinic acid. Other water-soluble compounds of platinum may be employed as impregnation solutions, including, for example, ammonium chloroplatinate and platinum chloride. The utilization of a platinum-chlorine compound, such as chlorophlatinic acid, is preferred since it facilitates the incorporation of both the platinum component and a minor quantity of a halogen component.

An optional component of the catalyst of the present invention is a halogen component. Although the precise chemistry of the association of the halogen component with the inorganic oxide support is not entirely known, it is customary in the art to refer to the halogen component as being combined with the support, or with the other ingredients of the catalyst. This combined halogen may be fluorine, chlorine, bromine, and mixtures thereof. Of these, fluorine and, particularly, chlorine are preferred for the purposes of the present invention. The halogen may be added to the support in any suitable manner, either during preparation of the support, or before or after the addition of the catalytically active metallic components. For example, at least a portion of the halogen may be added at any stage of the preparation of the support, or to the calcined catalyst support, as an aqueous solution of an acid such as hydrogen fluoride, hydrogen chloride, hydrogen bromide and the like or as a substantially anhydrous gaseous stream of these halogen-containing components. The halogen component, or a portion thereof, may be composited with the support during the impregnation of the latter with the platinum group component and/or iridium component, for example, through the utilization of a mixture of chlorophlatinic acid and/or chloroiridic acid and hydrogen chloride. In another situation, an alumina hydrosol which can be utilized to form the alumina component may contain halogen and thus contribute at least a portion of the halogen component to the final composite. For purposes of the present invention, when the catalyst support, for example, alumina derived from hydrous alumina, e.g., alumina monohydrate, is used in the form of an extrudate, and platinum is added before extrusion, it is preferred to add the major portion of the halogen component to the otherwise fully composited calcined catalyst by contacting this catalyst with a substantially anhydrous stream of halogen-containing gas. When the catalyst is prepared by impregnating calcined, formed alumina, for example, spheres produced by the oil drop method, it is preferred to impregnate the support simultaneously with the platinum group metal, iridium component and halogen. In any event, the halogen will be added in such a manner as to result in a fully composited catalyst that contains from about 0.1% to about 1.5% and preferably from about 0.5% to about 1.3% by weight of halogen calculated on an elemental basis. During processing, i.e., the period during which hydrocarbon is being converted, the halogen content of the catalyst can be maintained at or restored to the desired level by the addition of halogen-containing compounds, such as carbon tetrachloride, ethyl trichloride, t-butyl chloride and the like, to the hydrocarbon charge stock before entering the reaction zone.

The alumina-containing support utilized in the process of this invention comprises a major amount of alumina. Any of the forms of alumina suitable as supports, for example, in reforming, can be utilized. Furthermore, alumina can be prepared by a variety of methods satisfactory for the purposes of this invention. The preferred alumina material should be a porous, adsorptive support having a surface area of from about 25 m²/gm. to about 600 m²/gm. or more. The alumina comprises a major proportion, preferably at least about 80%, and more preferably at least 90%, by weight of the catalyst. The more preferred catalyst support, or base, is an alumina derived from hydrous alumina, particularly gamma alumina, when formed as pellets and calcined, has an apparent bulk density of from about 0.40 gm./cc. to about 0.85 gm./cc., pore volume of from about 0.45 ml./gm. to about 0.55 ml./gm., and surface area of from about 100 m²/gm. to about 500 m²/gm. As stated above, the alumina support may contain, in addition, minor proportions of other well-known refractory inorganic oxides such as silica, zirconia, magnesia and the like. However, the preferred support is substantially pure alumina derived from hydrous alumina.

The alumina support may be synthetically prepared in any suitable manner and may be activated prior to use by one or more treatments including drying, calcination, steaming and the like. The alumina may be formed in any desired shape such as spheres, pills, cakes, extrudates, powers, granules and the like. For example, the alumina base can be shaped into spheres by means of the well-known oil-drop method. If the spheroidal particles are calcined, the resulting product is a hard, porous alumina gel. When the catalyst used in the present invention is to be made in the form of spheres by means of the oil-drop method, it is preferred to add the additional essential components of the catalyst, i.e., platinum group metal, iridium and, optionally, halogen, after calcination of the spheroidal particles.

The catalyst prepared by the process of this invention can be utilized in a wide variety of processes which include reforming, hydrocracking, isomerization, dehydrogenation, hydrogenation, desulfurization, cyclization, alkylation, polymerization, cracking, hydroisomerization and the like. In many cases, the processes using these catalysts involve the simultaneous occurrence of more than one reaction. An example of this type of process is reforming, wherein a hydrocarbon feed stream comprising paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions to produce a high octane or aromatic-rich product stream. Another example of process in which more than one reaction occurs simultaneously is hydrocracking, wherein catalysts are used to promote selective hydrogenation and cracking of high molecular weight unsaturated materials, selective hydrocracking of high molecular weight materials and other like reactions to produce a generally lower boiling, more valuable product stream. Yet another example of a process utilizing these catalysts is an isomerization process, wherein, for example, a hydrocarbon fraction which is relatively rich in straight-chain paraffin components is contacted with the catalyst to produce an output stream rich in isoparaffin compounds.

When the catalyst described herein is used in a reforming operation, the reforming system may comprise a reforming zone containing at least one fixed bed of the catalyst previously characterized. This reforming zone may be one or more separate reactors with suitable heating means there between to compensate for the net endothermic nature of the reactions that take place in each catalyst bed. The hydrocarbon feed stream that is charged to the reforming system will comprise hydrocarbon fractions containing naphthenes and paraffins that boil within the gasoline range. A preferred class of charge stocks includes straight run gasolines, natural gasolines, synthetic gasolines and the like. On the other hand, it is frequently advantageous to charge thermally or catalytically cracked gasolines or higher boiling fractions thereof, called heavy naphthas. Mixtures of straight run and cracked gasolines can also be used to advantage. The gasoline charge stock may be a full boiling range gasoline having an initial boiling point of from about 50°F. to about 150°F. and an end boiling point within the range of from about 325°F. to about 425°F., or may be a selected fraction thereof which generally will be a higher boiling fraction commonly referred to as a heavy naphtha — for example, a naphtha boiling in the range of about $C_7$ to about 400°F. In some cases, it is also advantageous to charge pure hydrocarbons or mixtures of hydrocarbons that have been extracted from hydrocarbon distillates — for example, a straight-chain paraffin — which are to be converted to aromatics. It is preferred that these charge stocks be treated by conventional pretreatment methods, if necessary, to remove substantially all sulfurous and nitrogenous contaminants therefrom.

In the reforming embodiment of the present invention, the pressure utilized is selected in the range of from about 50 psig. to about 1000 psig., with the preferred pressure being from about 100 psig. to about 600 psig. Reforming operations may be conducted at the more preferred pressure range of from about 200 psig. to about 400 psig. to achieve substantially increased catalyst life before regeneration.

For optimum reforming results, the temperature in the reaction zone should preferably be within the range of from about 700°F. to about 1100°F. more preferably in the range of from about 800°F. to about 1050°F. The initial selection of the temperature within this broad range is made primarily as a function of the desired octane of the product reformate, considering the characteristics of the charge stock and of the catalyst. The temperature may then be slowly increased during the run to compensate for the inevitable deactivation that occurs, to provide a constant octane product.

In accordance with the reforming process of the present invention, sufficient hydrogen is supplied to provide from about 2.0 to about 20 moles of hydrogen per mole of hydrocarbon entering the reaction zone, with excellent results being obtained when from about 5 to about 10 moles of hydrogen are supplied per mole of hydrocarbon charge stock. Likewise, the weight hourly space velocity, i.e., WHSV, used in reforming may be in the range from about 0.5 to about 10.0 with a value in the range from about 2.0 to about 5.0 being preferred. In addition, the catalyst can be sulfided prior to contact with the feed in the reaction zone utilizing conventional presulfiding processes.

The following examples illustrate more clearly the processes of the present invention. However, these illustrations are not to be interpreted as specific limitations on this invention.

EXAMPLE I

A commercially available gamma-alumina was utilized to prepare the platinum-iridium supported alumina-containing catalyst. The alumina had a pore volume of 1 cc./gm., a density of 0.50 gm./cc., a surface area of 240 sq. meters and a diameter of ½ in. The alumina was in the form of an extrudate.

A solution of deionized water containing 6.87 ml. of chloroplatinic acid (56.17 mg. platinum per ml.), 2.93 ml. of chloroiridic acid (37.43 mg. iridium per ml.) and 5 ml. of dilute hydrochloric acid was adjusted to a pH of 5.5 with ammonium hydroxide. The gamma-alumina (117 gm.) was vacuum impregnated at a temperature of about 190°F. with the iridium-containing aqueous solution. The impregnated alumina was maintained at ambient temperature for a period of 20 hours. The iridium-alumina composite was vacuum dried until free flowing and further dried for a period of 24 hours at a temperature of 230°F. The platinum-iridium alumina was calcined for a period of 3 hours at a temperature of 900°F. in a stream of dry air. The resulting platinum-iridium alumina composite was contacted with hydrogen for a period of 16 hours at 900°F. and atmospheric pressure. The catalyst contained 0.33 weight % platinum and 0.11 weight % iridium.

EXAMPLE II

A platinum-iridium alumina composite was manufactured according to the process of Example I, except the pH of the liquid medium was maintained at 1.0. The resulting platinum-iridium alumina composite contained 0.31 weight % platinum and 0.10 weight % iridium.

EXAMPLE III

A platinum-iridium alumina composite was manufactured according to the process of Example I, except the ammonium hydroxide was added until the pH of the liquid medium was 9.0. The resulting platinum-iridium alumina composite contained 0.34 weight % platinum and 0.11 weight % iridium.

EXAMPLE IV

A solution of deionized water containing 6.87 ml. of chloroplatinic acid (56.17 mg. platinum per ml.), 2.93 ml. of chloroiridic acid (37.43 mg. iridium per ml.), 6 ml. of dilute hydrochloric acid, and 2 mg. of ammonium nitrate was prepared. The gamma-alumina (117 gm.) was vacuum impregnated at a temperature of 190°F. with the iridium-containing aqueous solution. The impregnated alumina was maintained at ambient temperature for a period of 20 hours. The impregnated alumina was vacuum dried until free flowing and further dried for a period of 5 hours at a temperature of 230°F. The platinum-iridium alumina was calcined for a period of 3 hours at a temperature of 900°F. in a stream of dry air. The resulting platinum-iridium alumina composite was contacted with hydrogen for a period of 16 hours at 900°F. and atmospheric pressure. The catalyst contained 0.33 weight % platinum and 0.11 weight % iridium.

The catalysts of Examples I through IV were performance tested as reforming catalysts by contacting the catalysts with a typical mid-continent naphtha feedstock at a temperature of about 950°F., WHSV of 4, a pressure of 300 psig., and a mole ratio of hydrogen to hydrocarbon of from 3:1. The catalyst was subjected to hydrocarbon reforming for about 150 hours. The results of these tests are as follows:

| Catalyst | Example I | Example II | Example III | Example IV |
| --- | --- | --- | --- | --- |
| Initial Research Octane Number (clear) | 100.6 | 99.8 | 101.5 | 101.3 |
| Aging Rate, Research Octane Number per 100 hours | 1.0 | 1.5 | 2.8 | 5.4 |
| Standard Aging Rate* Research Octane Number per 100 hrs. | 0.9 | 1.5 | 2.3 | 4.3 |

*Based upon data correlation techniques known to give reasonable predictions of commercial catalyst aging behavior.

The above results demonstrate a significant increase in the stability of the iridium supported catalyst prepared by the process of the present invention. Thus, the standard aging rate for the catalyst prepared by the process of this invention, e.g., Example I, was only 0.9, as compared to significantly higher aging rates of platinum-iridium catalyst prepared at pH's of 1 and 9, respectively. In addition, a comparison of the aging rate of Examples I and IV demonstrates the importance of the base material which is utilized in the process of this invention. Thus, the use of ammonium as a source of ammonium ion in comparison to ammonium hydroxide showed a significantly higher aging rate.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A process for the preparation of an iridium-on-alumina catalyst which comprises impregnating an alumina-containing support with a liquid medium containing a soluble iridium compound, maintaining the pH of the liquid medium during impregnation of the support in the range of from 3 to 6 with a base selected from ammonium hydroxide, a lower alkyl amine and mixtures thereof to yield an iridium alumina composite comprising from about 0.01 to about 1 weight % of iridium and subjecting the resulting iridium compositions to drying, calcination and reduction.

2. A process of claim 1 wherein the liquid medium contains a decomposable platinum compound and the alumina-containing support is an alumina derived from hydrous alumina.

3. A process of claim 1 wherein the base is ammonium hydroxide.

4. A process of claim 2 wherein the base is ammonium hydroxide.

5. A process of claim 2 wherein the iridium compound is chloroiridic acid.

6. A process of claim 4 wherein the iridium compound is chloroiridic acid.

7. A process of claim 2 wherein the decomposable platinum compound is present at a concentration to yield alumina composite comprising from about 0.05 to about 1.0 weight % platinum.

8. A process of claim 4 wherein the platinum is present at a concentration of from about 0.10 to about 1 weight % and the iridium is present at a concentration of about 0.025 to about 0.50 weight %.

9. A process of claim 3 wherein the pH of the liquid medium is from about 3.5 to 5.

10. A process of claim 8 wherein the pH of the liquid medium is from about 3.5 to 5.

* * * * *